United States Patent [19]

Gutowski et al.

[11] Patent Number: 4,633,742

[45] Date of Patent: Jan. 6, 1987

[54] PNEUMATIC PRESS CONTROLLER AND METHOD

[75] Inventors: Timothy A. Gutowski, Spring Lake; Merl T. Tucker, Grand Haven, both of Mich.

[73] Assignee: Contour Roll Company, Grand Haven, Mich.

[21] Appl. No.: 757,154

[22] Filed: Jul. 22, 1985

[51] Int. Cl.⁴ .................... B23D 36/00; B26D 5/12; B26D 5/26

[52] U.S. Cl. ........................................ 83/13; 83/42; 83/208; 83/287; 83/369; 83/639; 60/368; 60/370; 60/376; 72/441; 91/247; 100/48; 100/256

[58] Field of Search .................. 83/13, 42, 208, 369, 83/639; 60/368, 370, 376; 91/247; 100/48, 256, 257; 72/441

[56] References Cited

U.S. PATENT DOCUMENTS

| | | | |
|---|---|---|---|
| 3,081,657 | 3/1963 | Harris | 83/294 |
| 3,406,601 | 10/1968 | Clifford | 83/72 |
| 3,450,037 | 6/1969 | Lickliter et al. | 100/256 |
| 3,478,678 | 11/1969 | Lickliter et al. | 100/49 |
| 3,545,368 | 12/1970 | Lickliter et al. | 100/49 |
| 3,599,561 | 8/1971 | Reeves | 100/53 |
| 3,620,114 | 11/1971 | Chudyk | 83/107 |
| 3,670,614 | 6/1972 | Streckert | 83/208 |
| 3,707,255 | 12/1972 | Ridgway et al. | 226/136 |
| 3,760,669 | 9/1973 | Rosenthal et al. | 83/63 |
| 3,978,703 | 9/1976 | Primich et al. | 72/131 |
| 3,996,826 | 12/1976 | McKeever | 83/208 |
| 4,257,295 | 3/1981 | Patel | 83/374 |
| 4,436,007 | 3/1984 | Russon et al. | 83/23 |
| 4,457,195 | 7/1984 | Brooks | 83/69 |
| 4,476,754 | 10/1984 | Ducret | 83/150 |

OTHER PUBLICATIONS

"Single Solenoid Pilot Controlled 3/2—Normally Closed Valve" by Ross Operating Valve Company, Detroit, Michigan 48203.

*Primary Examiner*—Donald R. Schran
*Attorney, Agent, or Firm*—Price, Heneveld, Huizenga & Cooper

[57] ABSTRACT

A controller and method are provided for controlling pneumatic presses, and similar machines. The controller comprises a gauge to measure increments of stock length passing through the press, a length recorder to set the desired piece length, and a length comparator which compares the readout of the gauge with the preset recorder piece length, and when equal, generates a stroke initiate signal. The stroke initiate signal opens an air valve portion of the pneumatic press to communicate pressurized air with the power side of an air actuated ram, which in turn converges the press platens to perform the desired press function, such as punching holes, notching, cutoff, or the like. The controller also includes a timer to measure time beginning from the stroke initiate signal, a time recorder to set the time the air valve is to remain open, and a time comparator which compares the readout of the timer with the preset valve open time, and when equal, generates a stroke halt signal. The stroke halt signal closes the air valve to cease extension of the ram, and permit the platens to automatically diverge by means such as return springs, or the like. The stroke of the press is varied in accordance with each selected press operation and application to minimize press cycle time, and to increase production speed.

22 Claims, 6 Drawing Figures

PNEUMATIC PRESS CONTROLLER AND METHOD

BACKGROUND OF THE INVENTION

The present invention relates to pneumatic presses and the like, and in particular to a press controller and method for controlling presses.

Pneumatic presses such as those disclosed in U.S. Pat. Nos. 3,599,561; 3,478,678; 3,545,368; and 3,450,037 are generally well-known in the art, and comprise mating platens which reciprocate through a stroke defined between open and closed platen positions. An air actuated cylinder or ram is positioned generally between the platens, and a valve is positioned between a source of pressurized air and the ram. The valve has an open position in which pressurized air communicates with the power side of the ram to converge the platens to the closed position, and a closed position in which the pressurized air does not communicate with the power side of the ram. A mechanism, such as return springs or the like, are provided to automatically diverge the platens to the normally open position when the valve is closed.

Heretofore, control mechanisms for pneumatic presses have generally comprised a microswitch arrangement. In one such arrangement, similar to that disclosed in U.S. Pat. No. 3,081,657, a microswitch with a pivoting on-off control arm is mounted on the stationary platen, and an adjustable switch stop is mounted on the reciprocating platen. The microswitch is connected to and controls a solenoid operated poppet valve, which opens and closes to reciprocate the air actuated ram and the press platens. During the power stroke of the press, the adjustable switch stop physically abuts the microswitch control arm, and shifts the microswitch into the "off" position to close the valve. The power stroke is thereby halted, and the platens are returned to their normally diverged position. As the press retracts, the control arm is permitted to return to its initial "on" position to begin another stroke cycle of the press.

A major drawback associated with such microswitch press controllers is that they have a relatively slow reaction time. Hence, although certain types of press operations and applications do not require a long stroke of the press, prior controllers have been unable to cycle the press at speeds that provide maximum efficiency and productivity. For example, in one known pneumatic press having a microswitch type of controller, the minimum time that the solenoid valve can remain actuated is approximately 40 milliseconds. Hence, the press speed is automatically limited in accordance with the microswitch lag time, even though a much shorter valve actuation time would accomplish the desired press operation.

Another drawback associated with such microswitch press controllers is that they cause the press to "bounce." Since prior microswitch controllers have a minimum time that the solenoid valve can remain actuated, the minimum length of the press power stroke is also set. When the minimum power stroke of the press exceeds the maximum stroke of the die, the reciprocating platen hits or bottoms out against mating platen stops on the press, causing the press to "bounce." This "bouncing" results in substantial noise, premature press and die fatigue, vibration of the shop floor and adjacent machinery, and can even have unfavorable safety ramifications under certain circumstances.

Hence, it is desirable to provide a controller that is capable of operating the press at maximum speed for a particular operation and application so as to increase production and efficiency, and which consistently regulates the press stroke at a distance that avoids press bouncing.

SUMMARY OF THE INVENTION

One aspect of the present invention is to provide a controller and method for controlling pneumatic presses, and similar machines. The invention comprises a gauge that measures increments of stock length passing through the press, a length recorder to set the desired piece length, and a length comparator which compares the readout of the gauge with the preset recorder piece length, and when equal, generates a stroke initiate signal. The stroke initiate signal opens an air valve portion of the press to communicate pressurized air with the power side of an air actuated ram, which in turn converges the press platens to perform the desired press function or operation. The invention also includes a timer to measure time beginning from the stroke initiate signal, a time recorder to set the time the air valve is to remain open, and a time comparator which compares the readout of the timer with the preset valve open time, and when equal, generates a stroke halt signal. The stroke halt signal closes the air valve to cease extension of the ram, and permits the platens to automatically diverge to their normally open position. The stroke of the press is varied in accordance with each selected press operation and application to minimize press cycle time, increase production speed, and alleviate press bouncing.

The principal objects of the present invention are to provide a press controller and method that uses time to accurately control press stroke, in order to minimize press cycle time, and increase production speed and alleviate press bouncing. The controller is fully adjustable to maximize press efficiency for a wide variety of different types of press operations and applications. The controller accurately controls the press stroke to reduce press bouncing, and the associated vibrations, noise, and safety problems. The controller is relatively inexpensive to manufacture and install, and is adapted to be used in conjunction with conventional pneumatic press valves and porting systems. The controller is relatively uncomplicated, durable, and capable of being operated by relatively inexperienced personnel. The controller is adapted for use in conjunction with multi-stage press operations, is efficient in use, capable of a long operating life, and particularly well adapted for the proposed use.

These and other features, advantages, and objects of the present invention will be further understood and appreciated by those skilled in the art by reference to the following written specification, claims and appended drawings.

DETAILED DESCRIPTION OF THE PREFERRED EMBODIMENTS

Figure 1:
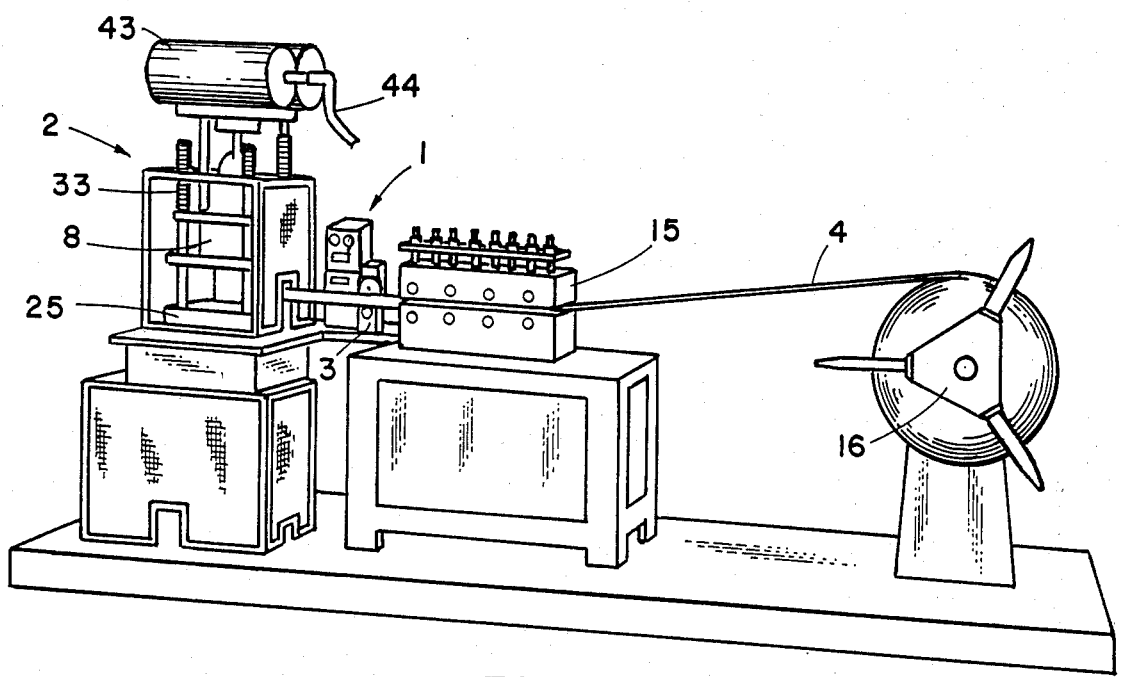
FIG. 1 is a partially schematic, side elevational view of a part forming machine, having a pneumatic press with a controller embodying the present invention.
Figure 4:
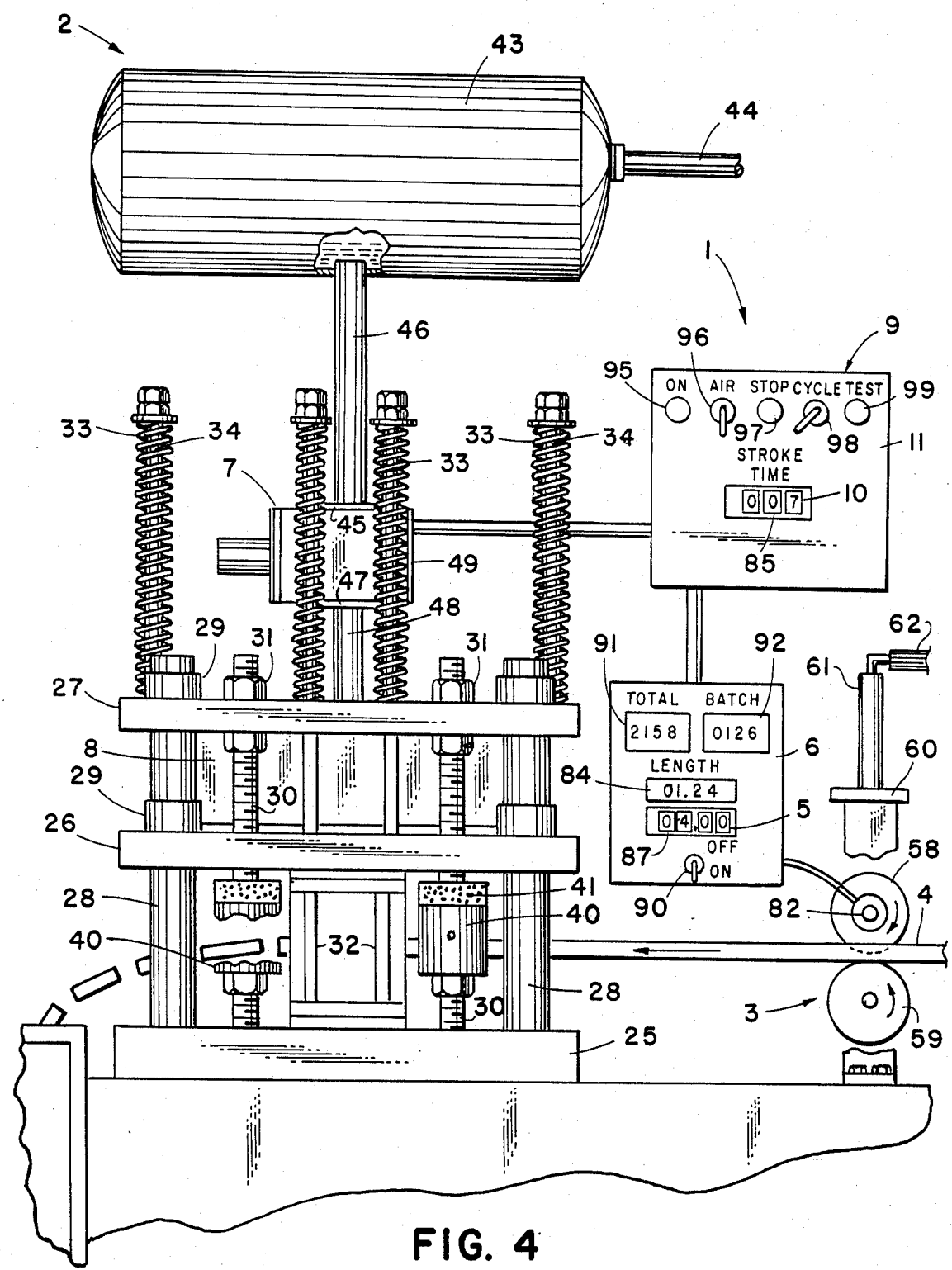
FIG. 4 is a partially schematic, side elevational view of the pneumatic press and the controller, with opposing press platens shown in a diverged position.
Figure 5:
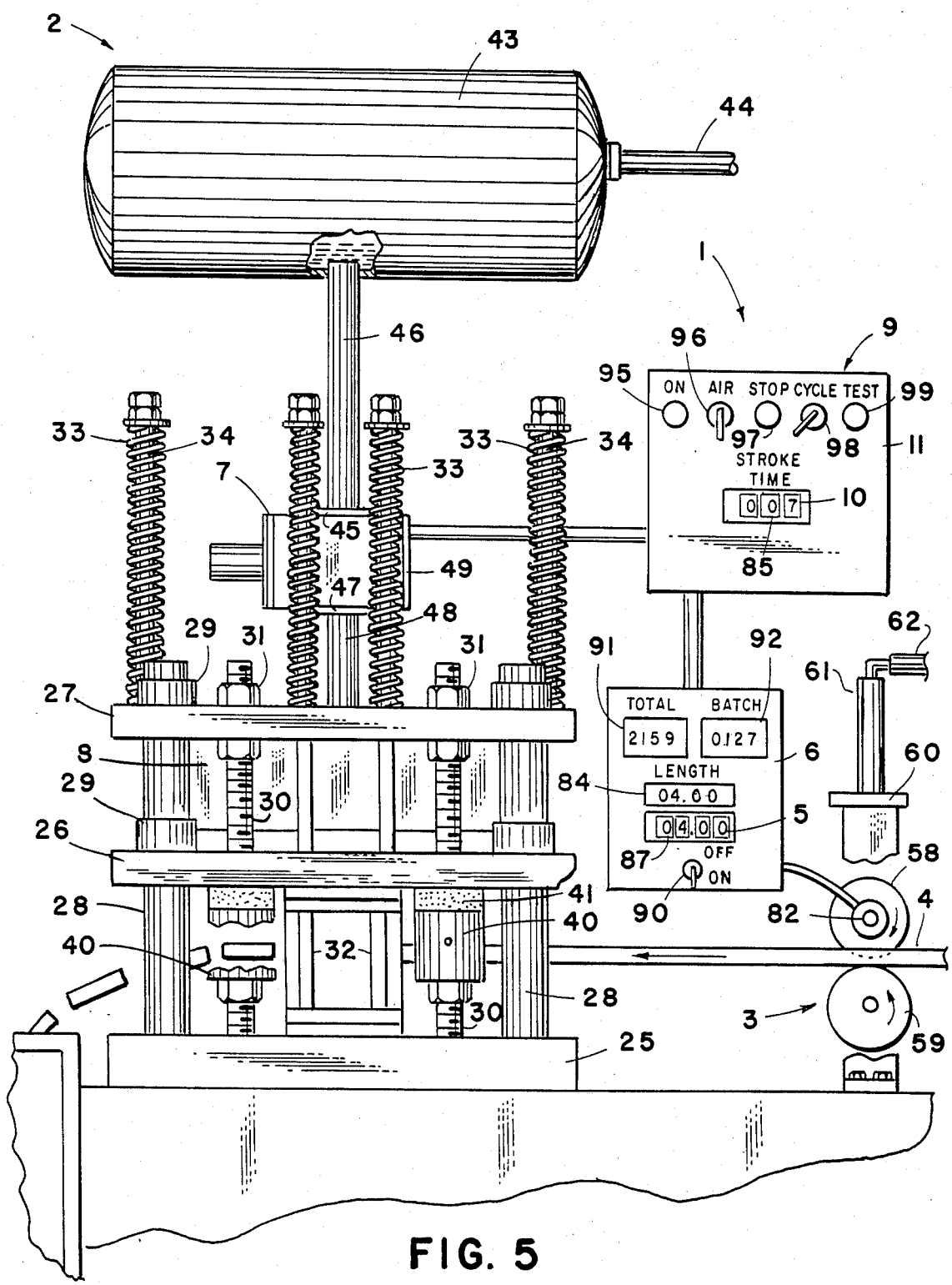
FIG. 5 is a partially schematic, side elevational view of the pneumatic press and the controller, with the press platens shown in a converged position.

For purposes of description herein, the terms "upper," "lower," "right," "left," "rear," "front," "vertical", "horizontal," and derivatives thereof shall relate to the invention as oriented in FIGS. 1, 4 and 5. However, it is to be understood that the invention may assume various alternative orientations, and step sequences, except where expressly expressed to the contrary.

The reference numeral 1 (FIG. 1) generally designates a controller embodying the present invention. Controller 1 is particularly adapted for controlling a pneumatic press 2, and similar press machines. Controller 1 comprises a gauge 3 (FIG. 4) to measure increments of length of stock material 4 passing through press 2, a length recorder 5 to set the desired piece length, and a length comparator 6 which compares the readout of gauge 3 with the preset piece length in recorder 5, and when equal, generates a stroke initiate signal. The stroke initiate signal opens an air valve 7 associated with press 2, thereby communicating pressurized air with the power side of an air actuated cylinder or ram 8 to initiate the power stroke of press 2. Controller 1 also includes a timer 9 to measure time beginning from the stroke initiate signal, a time recorder 10 to set the time air valve 7 is to remain open, and a time comparator 11 which compares the readout of timer 9 with the time interval preset in time recorder 10, and when equal, generates a stroke halt signal. The stroke halt signal closes air valve 7 to cease extension of ram 8, and terminate the power stroke of press 2. The stroke of press 2 is varied in accordance with each selected press operation application to minimize press cycle time, and alleviate press bouncing.

With reference to FIG. 1, controller 1 is shown in conjunction with a roll forming machine 15. A coil of flat stock material 4 is payed from a rotary storage roll or drum 16, and is fed into roll forming machine 15, which has multiple stations to form the strip 4 into the desired configuration. In the example illustrated in FIGS. 4 and 5, roll forming machine 15 upturns the side edges of stock 4, such that the stock exiting from roll forming machine 14 has a generally U-shaped transverse cross-sectional configuration.

Aside from controller 1, the illustrated pneumatic press 2 (FIG. 4) has a generally conventional construction, and comprises a stationary platen 25, a reciprocating platen 26, and an adjustable platen 27. Vertical support rods 28 are connected with and upstanding from stationary platen 25 adjacent the four corners thereof. Reciprocating platen 26 and adjustable platen 27 are slidably mounted on support rods 28 by bearings 29. Adjustable support rods 30 are also connected with stationary platen 25, and extend vertically upwardly therefrom. Adjustable support rods 30 extend through mating apertures in reciprocating platen 26, and the upper ends of adjustable support rods 30 are attached to adjustable platen 27 by nuts 31. Adjustable support rods 30 mount adjustable platen 27 on stationary platen 25, and permit adjusting the vertical height therebetween to accommodate different dies 32. Air actuated ram 8 is positioned between adjustable platen 27 and reciprocating platen 26, such that the extension of ram 8 moves reciprocating platen 26 downwardly to converge the die halves into a closed position, and retraction of ram 8 permits platen 26 to move upwardly to diverge the die halves into an open position. In the illustrated example, return springs 33 are mounted on adjustable platen 26 by mating rods 34, and resiliently urge reciprocating platen 26 upwardly, and automatically return the die halves to the open position when the power stroke of press 2 is halted.

A plurality of stops 40 are mounted on adjustable support rods 30 at the lower portion of press 2, and include bumpers 41, which are adapted to engage the lower surface of reciprocating platen 26 to positively stop downward translation of the same, and thereby fix the bottom position of the press power stroke. Stops 40 are vertically adjustable on support rods 30, so as to vary the bottom stroke position in accordance with the specific type of press operation and application desired.

In the illustrated example, press 2 includes a high pressure air reservoir 43, which communicates with a source of pressurized air through pipe 46. The inlet side 45 of valve 7 communicates with air reservoir 43 through a pipe 46, and the outlet side 47 of valve 7 communicates with ram 8 through a pipe 48.

In the illustrated example of the present invention, air valve 7 comprises a conventional solenoid operated valve. One example of a suitable valve is a single solenoid pilot controlled three-way poppet valve having a normally closed position, such as that manufactured by Ross Operating Valve Company of Detroit, Mich. under Model No. 2773B8001. The exemplary valve 7 includes an exhaust port 49. When the valve solenoid is energized, the inlet port 45, and the outlet port 47 are fully open and communicating, and the exhaust port 52 is closed. When the solenoid is deenergized, the inlet port 45 is closed, and the outlet port 47 and the exhaust port 52 are fully open and communicating, such that return springs 33 automatically collapse ram 8 to its fully retracted position when valve 7 is closed.

It is to be understood that the term "pneumatic press" as used herein is intended to include presses that are actuated not only by high pressure air, but also presses that are actuated by other high pressure gases and fluids, as well as presses which have a similar type of variable power stroke that can be initiated and halted at any time during the press cycle.

Length gauge 3 may comprise any suitable instruments for measuring the longitudinal translation of stock 4 through press 2, and in the illustrated example comprises two rollers or wheels 58 and 59 (FIG. 4), which are arranged in a vertically aligned orientation. The peripheral surfaces of wheels 58 and 59 are spaced apart slightly to closely and frictionally receive stock material 4 therebetween, such that longitudinal translation of the stock material 4 rotates wheels 58 and 59. In the illustrated example, gauge 3 includes a housing 60 in which wheels 58 and 59 are rotatably supported. The lower wheel 59 is vertically stationary in housing 60, and the upper wheel 58 is vertically adjustable in housing 60 to vary the gap or space between the peripheral surfaces of wheels 58 and 59 to accommodate different thicknesses of stock material. A fluid cylinder 61 is mounted on housing 60, and is connected with upper wheel 58 to vertically raise and lower the same with respect to lower wheel 59. The illustrated cylinder 61 comprises a pneumatic ram, which is connected with the source of pressurized air by a pipe 62.

Figure 2:
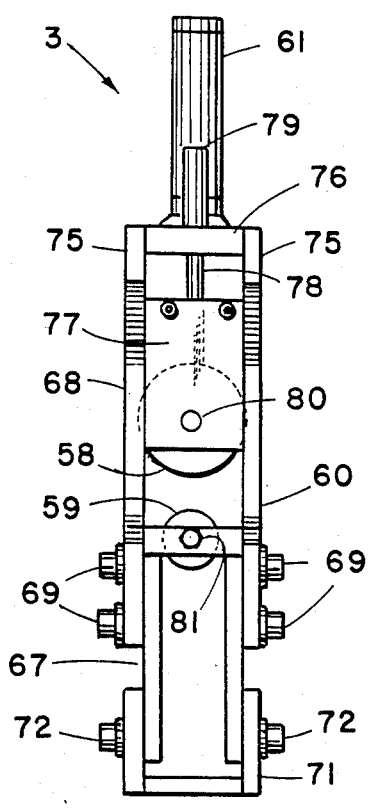
FIG. 2 is a side elevational view of a length gauge portion of the present invention.
Figure 3:
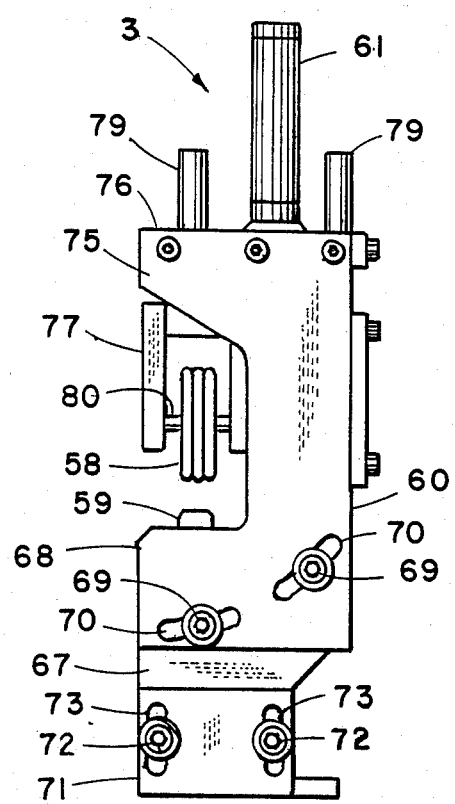
FIG. 3 is an end elevational view of the length gauge.

With reference to FIGS. 2 and 3, the illustrated gauge housing 60 comprises a tiltable stand, having a lower base portion 67, and an upper housing 68 pivotally supported on base 67. Fasteners 69 extend through arcuate slots 70 in upper housing 68, and into base 67 to adjustably connect upper housing 68 with base 67 at a selected orientation. Base 67 has a vertically adjustable foot 71 to raise and lower the position of gauge wheels 58 and 59. Fasteners 72 extend through vertical slots 73 in foot 71, and into base 67 to provide vertical adjustment for upper housing 68.

As best illustrated in FIG. 2, upper housing 68 has a side elevational configuration which is generally U-shaped with opposite flanges 75 and a top plate 76. A sliding carriage 77 is mounted between flanges 75 by mating alignment pins 78 and bushings 79. The upper wheel 58 is rotatably mounted on carriage 77 by an axle 80. The lower wheel 59 is rotatably mounted on the stationary portion of housing 68 by an axle 81. Pneumatic cylinder 61 is connected with carriage 78, such that reciprocation of cylinder 61 raises and lowers upper wheel 58 with respect to lower wheel 59. During operation, cylinder 61 exerts a force on upper wheel 58 to force both wheels 58 and 59 securely against the opposite sides of the stock material translating therebetween to insure accurate measure, even when the stock material 4 is not perfectly flat. In the illustrated controller 1, upper wheel 58 is ribbed and constructed from a phenolic material, and lower wheel 59 is knurled and constructed from metal to securely engage the stock material 4, and alleviate any slippage therebetween.

The illustrated gauge 3 (FIG. 4) includes a sensor or pulse generator in the form of a rotary transducer 82 rotating with upper wheel 58. Rotary transducer 82 generates a signal in response to rotation of wheel 58, as stock strip 4 passes between wheels 58 and 59. A counter 83 (FIG. 6) is operably connected with rotary transducer 82, and provides a continuous readout of the generated pulses to reflect an associated length of stock material passing between gauge wheels 58 and 59. In the example illustrated in FIGS. 4 and 5, counter 83 has a conventional construction, and includes a display 84 of the continuous length readout.

Length recorder 5 (FIG. 6) is a conventional device, having the ability to digitally record a certain length of stock material translating through press 2 for the purposes of cutting the stock to length, locating punch holes, or the like. Length recorder 5 is variable to select different length locations, and in the illustrated example comprises a switch, having a plurality of thumb wheel indicators 85 for each digit. Hence, the operator simply rotates each of the thumb wheels 85 on switch 5 to conform to the length at which the desired press operation is to be performed.

The length comparator 6 comprises a conventional electric circuit which is operably connected with rotary transducer counter 83 and the thumb wheel switch length recorder 5, and when equal, generates or causes to be generated, a stroke initiate signal. In the example illustrated in FIG. 6, a conventional relay 86 is connected with length comparator 6, and supplies high voltage electrical power to solenoid valve 7 in response to the stroke initiate signal. The stroke initiate signal trips relay 86, and causes solenoid valve 7 to be energized, thereby extending ram 8 and initiating the power stroke of press 2. Length counter 83 is operably connected with relay 86 such that the stroke initiate signal automatically resets or zeros counter 83.

Figure 6:
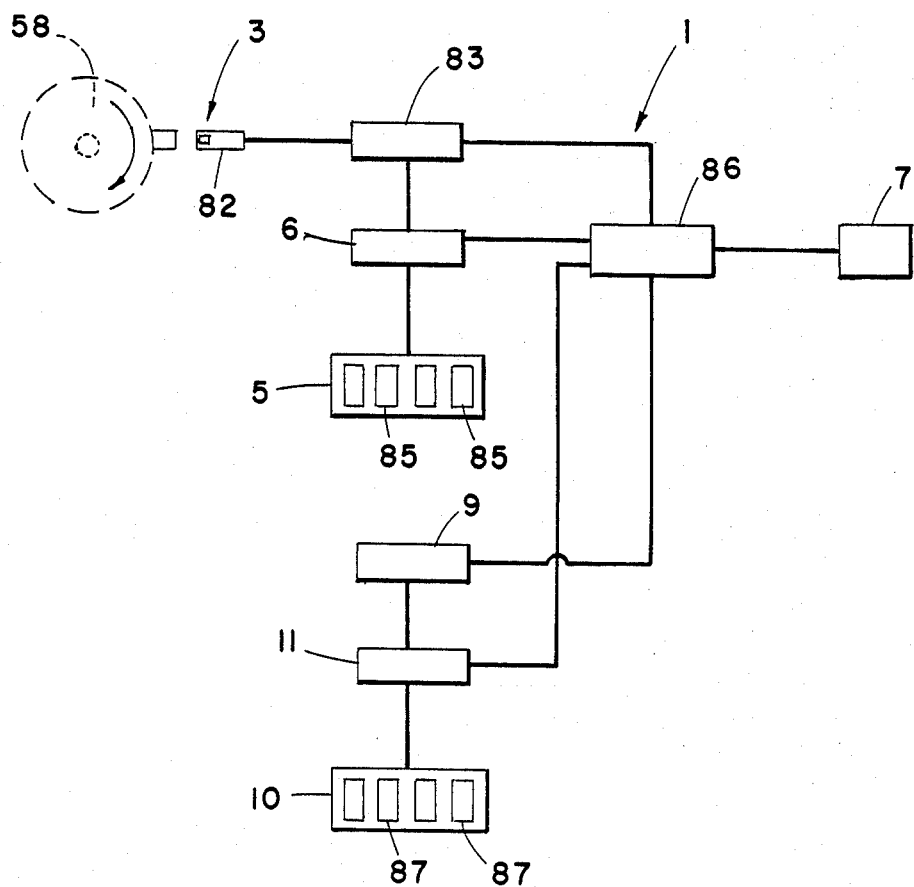
FIG. 6 is a schematic illustration of the controller.

The illustrated timer 9 also has a conventional construction, and is adapted to measure time intervals from a zero point. As schematically illustrated in FIG. 6, timer 9 is operably connected with time comparator 11 and relay 86. Timer 9 has a continuous readout, and is automatically reset or zeroed in response to the stroke initiate signal.

The illustrated time recorder 10 also has a conventional construction, and is similar to length recorder 5 insofar as it comprises a multi-position thumb wheel switch, wherein the individual thumb wheels 87 are rotated to select a certain time interval. The time interval selected by the press operator is in accordance with the length of the press stroke required for the specific press operation and application. In one example of the present invention, an imperically derived chart may be used to select an initial time interval for time recorder 10, as discussed in greater detail hereinafter.

Time comparator 11 also has a conventional construction, and is operably connected with timer 9 and time recorder 10. Time comparator 11 compares the readout of timer 9 with the time interval entered in time recorder 10, and when equal, generates a stroke halt signal. The stroke halt signal deactivates, or causes to be deactivated, solenoid valve 7, thereby terminating the power stroke of press 2. In the illustrated example, the stroke halt signal closes relay 85 to deenergize solenoid valve 7. When solenoid valve 7 is closed, the air pressure in ram 8 is exhausted through the exhaust port 49 thereby permitting return springs 33 to automatically diverge platens 25 and 26 to the fully open position.

In one example of the present invention, controller 1 is capable of reducing the open time of conventional solenoid valve 7 to approximately 2 to 4 milliseconds. Since prior microswitch controllers have a minimum valve open time of 40 milliseconds for an identical solenoid valve and press arrangement, the present invention greatly increases press speed, and also alleviates press bouncing.

In operation, controller 1 is adjusted to minimize stroke cycle time, and maximize production speed. In the example illustrated in FIGS. 4 and 5, press 2 is set up to cut off lengths of stock material formed by roll forming machine 15. The desired piece length is entered into length recorder 5, which in the present example is set at 4.00 inches. The stroke time is then entered into time recorder 10 in accordance with a specific press operation application being performed. Since the thickness of the illustrated stock material is relatively small, a relatively short press stroke is all that is necessary to properly cut the formed stock material 4 to length. In the illustrated example, the stroke time is entered in time recorder 10 as 007 milliseconds. It is to be understood that the initial stroke time entered in time recorder 10 may be imperically derived.

The operator then performs a test run, initiating the stroke cycle by manipulating cycle switch 98, which automatically zeros length gauge 3 and timer 9. The operator then stops press operation by manipulating stop switch 97, and inspects the initial parts produced. In the event that the parts are not cut cleanly due to too short of press stroke, the operator adjusts time recorder 10 upwardly until a proper cutoff is achieved. In the event that the parts have been cut cleanly, the operator adjusts the stroke time downwardly to that minimum amount of time which will yield an acceptable cutoff. Once the controller has been properly adjusted, press 2 is permitted to cycle automatically until the total number of desired parts has been produced.

Controller 1 is thereby capable of maximizing press production speed. Since the stroke of press 2 is controlled by adjusting the increment of time solenoid valve 7 remains open, instead of a mechanically actuated microswitch, it is extremely accurate, and greatly alleviates press bouncing, and the associated vibration and noise. Controller 1 is fully adjustable to maximize press efficiency for a wide variety of different types of press operations and applications.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. In a pneumatic press of the type having mating platens which reciprocate through a stroke defined between open and closed platen positions, an air actuated ram positioned between said platens, a valve positioned between a source of pressurized air and said ram, with an open position in which pressurized air communicates with a power side of said ram to converge said platens to the closed position, and a closed position in which the pressurized air does not communicate with the power side of said ram, and means for automatically diverging said platens to the open position when said valve is closed, the improvement of a controller comprising:
   a gauge having means for measuring increments of length of stock material translating through said press, and providing a continuous readout;
   means for recording a preselected length of stock material;
   means for comparing the readout of said measuring means with the preselected length of said length recording means, and when equal, generating a stroke initiate signal;
   means for detecting said stroke initiate signal and opening said valve in response thereto;
   a timer having means for measuring increments of time from a zero point, and providing a continuous readout;
   means for recording a preselected amount of time;
   means for comparing the readout of said timer with the preselected time of said time recording means, and when equal, generating a stroke halt signal;
   means for detecting said stroke halt signal and closing said valve in response thereto, whereby the stroke of said press is varied in accordance with each selected press operation and application to minimize press cycle time, and increase production speed.

2. A press as set forth in claim 1, including:
   means for zeroing said gauge in response to said stroke initiate signal; and
   means for varying the preselected length set in said length recording means to accommodate different press operations and applications.

3. A press as set forth in claim 2, including:
   means for zeroing said timer in response to said stroke initiate signal; and
   means for varying the preselected amount of time set in said time recording means to accommodate different press operations and applications.

4. A press as set forth in claim 3, wherein:
   said stroke initiate and stroke halt signals comprise electrical signals; and
   said valve opening and closing means comprises a solenoid.

5. A press as set forth in claim 4, wherein said length measuring means comprises:
   first and second rollers between which the stock material is closely and frictionally received, such that longitudinal translation of the stock material rotates said rollers;
   a rotary transducer connected with one of said rollers, and including means for generating an electrical signal in response to longitudinal translation of the stock material through said rollers.

6. A press as set forth in claim 5, wherein said length measuring means further comprises:
   means for adjustably mounting said rollers to vary the distance between adjacent peripheral surfaces of said roller to accommodate receiving different stock materials therebetween; and
   a fluid actuated ram connected with said rollers to converge the same, and urge the peripheral surfaces of said rollers abuttingly against opposite sides of the stock material to insure accurate length measurement.

7. A press as set forth in claim 6, wherein:
   said platen diverging means comprises a plurality of springs arranged to resiliently urge said platens to the normal, open position.

8. A press as set forth in claim 7, including:
   means for counting and displaying the total number of press strokes.

9. A press as set forth in claim 8, wherein:
   said length measuring means comprises a tilt stand in which said rollers are rotatably mounted; said tilt stand including means for adjusting the elevation and inclination of said rollers with respect to said press to accommodate different stock materials.

10. A press as set forth in claim 1, including:
    means for zeroing said timer in response to said stroke initiate signal; and
    means for varying the preselected amount of time set in said time recording means to accommodate different press operations and applications.

11. A press as set forth in claim 1, wherein said length measuring means comprises:
    first and second rollers between which the stock material is closely and frictionally received, such that longitudinal translation of the stock material rotates said rollers;
    a rotary transducer connected with one of said rollers, and including means for generating an electrical signal in response to longitudinal translation of the stock material through said rollers.

12. A press as set forth in claim 11, wherein said length measuring means further comprises:
    means for adjustably mounting said rollers to vary the distance between adjacent peripheral surfaces of said rollers to accommodate receiving different stock materials therebetween; and
    a fluid actuated ram connected with said rollers to converge the same, and urge the peripheral surfaces of said rollers abuttingly against opposite sides of the stock material to insure accurate length measurement.

13. A press as set forth in claim 1, wherein:
    said length recording means comprises a multiple position switch; and said time recording means comprises a multiple position switch.

14. A press as set forth in claim 1, wherein:
said platen diverging means comprises a plurality of springs arranged to resiliently urge said platens to the normal, open position.

15. A press, comprising:
mating platens which reciprocate through a stroke defined between open and closed platen positions;
a fluid actuated ram connected with at least one of said platens;
a valve positioned operably between a source of pressurized fluid and said ram, with an open position in which pressurized fluid communicates with a power side of said ram to converge said platens to the closed position, and a closed position in which the pressurized fluid does not communicate with the power side of said ram;
means for automatically diverging said platens to the open position when said valve is closed;
a controller, comprising:
a gauge having means for measuring increments of length of stock material translating through said press, and providing a continuous readout;
means for recording a preselected length of stock material;
means for comparing the readout of said measuring means with the preselected length of said length recording means, and when equal, generating a stroke initiate signal;
means for zeroing said gauge in response to said stroke initiate signal;
means for varying the preselected length set in said length recording means to accommodate different press operations and applications;
means for detecting said stroke initiate signal and opening said valve in response thereto;
a timer having means for measuring increments of time from a zero point, and providing a continuous readout;
means for recording a preselected amount of time;
means for comparing the readout of said timer with the preselected time of said time recording means, and when equal, generating a stroke halt signal;
means for zeroing said timer in response to said stroke initiate signal;
means for varying the preselected amount of time set in said time recording means to accommodate different press operations and applications;
means for detecting said stroke halt signal and closing said valve in response thereto, whereby the stroke of said press is varied in accordance with each selected press operation and application to minimize press cycle time, and increase production speed.

16. A press as set forth in claim 15, wherein:
said stroke initiate and stroke halt signals comprise electrical signals; and
said valve opening and closing means comprises a solenoid.

17. A press as set forth in claim 16, wherein said length measuring means comprises:
first and second rollers between which the stock material is closely and frictionally received, such that longitudinal translation of the stock material rotates said rollers;
a rotary transducer connected with one of said rollers, and including means for generating an electrical signal in response to longitudinal translation of the stock material through said rollers.

18. A press as set forth in claim 17, wherein said length measuring means further comprises:
means for adjustably mounting said rollers to vary the distance between adjacent peripheral surfaces of said roller to accommodate receiving different stock materials therebetween; and
a fluid actuated ram connected with said rollers to converge the same, and urge the peripheral surfaces of said rollers abuttingly against opposite sides of the stock material to insure accurate length measurement.

19. A press as set forth in claim 18, wherein:
said platen diverging means comprises a plurality of springs arranged to resiliently urge said platens to the normal, open position.

20. A method for controlling pneumatic presses of the type having mating platens which reciprocate through a stroke defined between open and closed platen positions, an air actuated ram positioned between said platens, a valve positioned between a source of pressurized air and said ram, with an open position in which pressurized air communicates with a power side of said ram to converge said platens to the closed position, and a closed position in which the pressurized air does not communicate with the power side of said ram, and means for automatically diverging said platens to the open position when said valve is closed, comprising:
measuring increments of length of stock material translating through said press, and providing a continuous readout;
recording a preselected length of stock material;
comparing the readout of said measuring means with the preselected length, and when equal, generating a stroke initiate signal;
zeroing said gauge in response to said stroke initiate signal;
detecting said stroke initiate signal an opening said valve in response thereto;
measuring increments of time from a zero point, and providing a continuous readout;
recording a preselected amount of time;
comparing the readout of said timer with the preselected time, and when equal, generating a stroke halt signal;
zeroing said timer in response to said stroke initiate signal;
detecting said stroke halt signal and closing said valve in response thereto, whereby the stroke of said press is varied in accordance with each selected press operation and application to minimize press cycle time, and increase production speed detecting said stroke halt signal and closing said valve in response thereto, whereby the stroke of said press is varied in accordance with each selected press operation and application to minimize press cycle time, and increase production speed.

21. A method as set forth in claim 20, including:
varying the preselected length set in said length recording means to accommodate different press operations and applications.

22. A method as set forth in claim 21, including:
varying the preselected amount of time set in said time recording means to accommodate different press operations and applications.

* * * * *